March 7, 1939.  W. A. D. SMITH ET AL  2,149,689
HEATING AND VENTILATING DEVICE
Filed Jan. 21, 1938  2 Sheets-Sheet 1

INVENTORS
W. A. Duncan Smith
N. H. Webb.
BY
ATTORNEY

March 7, 1939.  W. A. D. SMITH ET AL  2,149,689
HEATING AND VENTILATING DEVICE
Filed Jan. 21, 1938  2 Sheets-Sheet 2
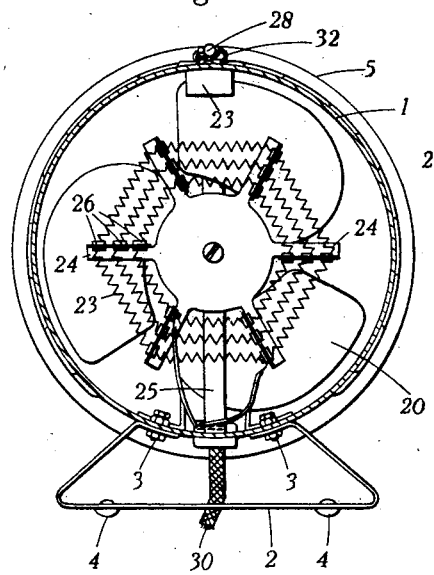
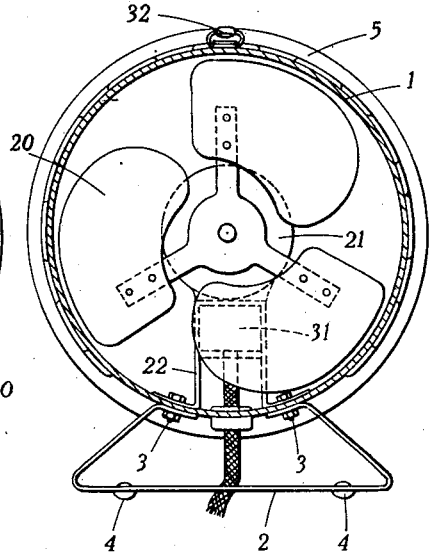
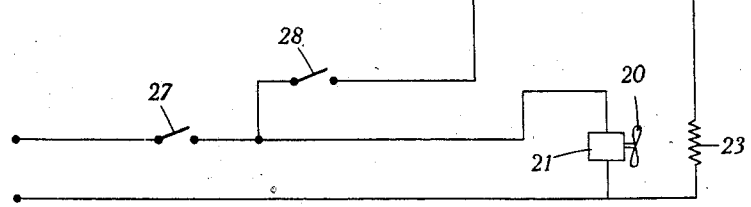
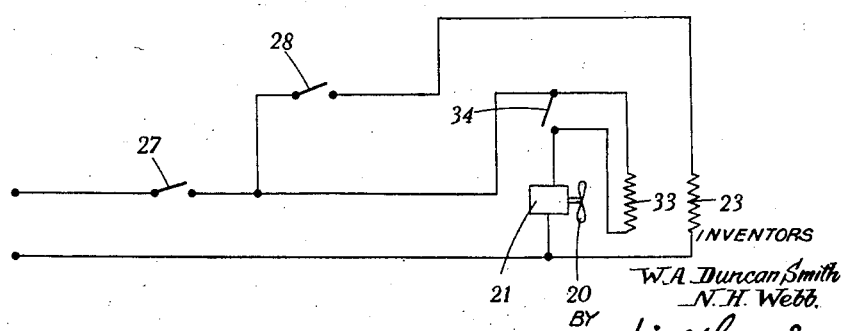
INVENTORS
W. A. Duncan Smith
N. H. Webb
BY
ATTORNEY Patented Mar. 7, 1939

2,149,689

UNITED STATES PATENT OFFICE 2,149,689

HEATING AND VENTILATING DEVICE

William Alec Duncan Smith, Hampstead, London, and Norman Hugh Webb, Hendon, London, England Application January 21, 1938, Serial No. 186,174
In Great Britain January 29, 1937

2 Claims. (Cl. 219—39)

This invention relates to heating and ventilating devices of the kind in which an electric fan and heater are arranged as a unit within a casing. The object of the invention is to provide an improved device of the type referred to which, although not limited thereto, is particularly adapted for clearing mist and condensation from the inside of windows, walls or other surfaces at which condensation is likely to take place, and to this end the invention comprises an electric fan and an electric heater housed within a tubular casing provided with an air inlet adjacent one end and an outlet at the opposite end furnished with means for deflecting or spreading in any desired direction or directions the air passing through said outlet.

In the accompanying drawings which illustrate this invention:

Figures 3 and 4 are sections on the lines III—III and IV—IV respectively of Figure 1, and, Figure 5 is a diagram of the electrical connections of the embodiment illustrated, and, Figure 6 is a diagram of the electrical connections of a modification.

Figure 1:
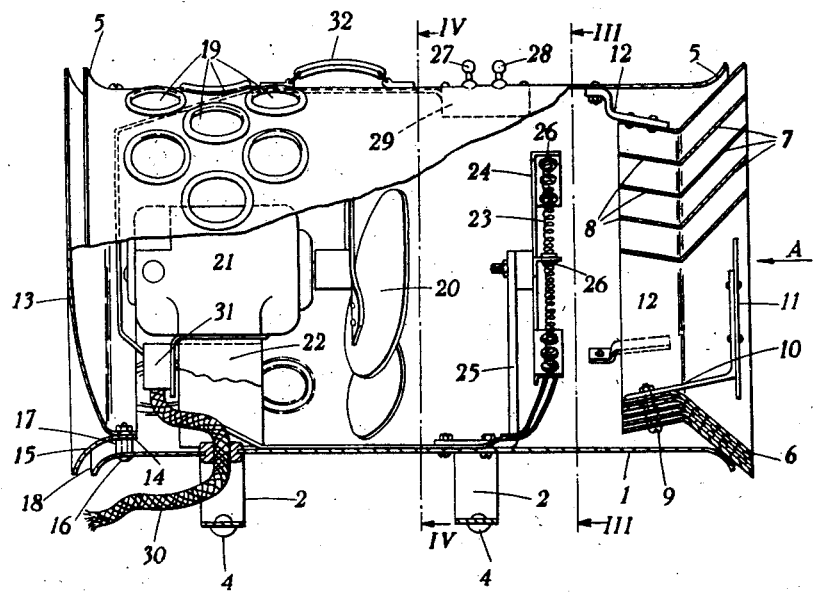
Figure 1 is a central longitudinal section partly in elevation of one embodiment.
Figure 2:
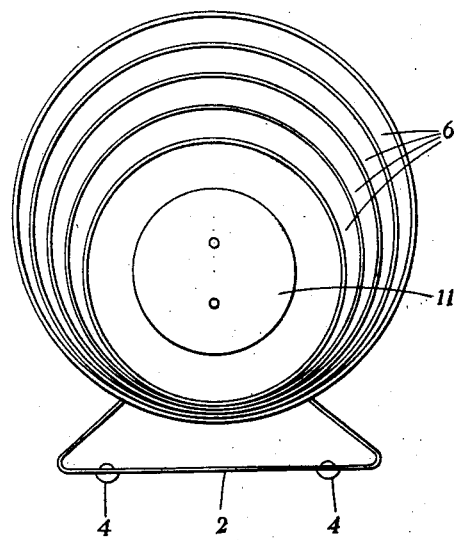
Figure 2 is an end elevation of Figure 1 in the direction indicated by the arrow A.

The embodiment of this invention shown in the drawings comprises a cylindrical metal casing 1 provided with supports which may consist of bent metal strips 2 secured to said casing by nuts and bolts 3 and provided with rubber pads 4. The ends of said casing are flared outwardly at 5 and the outlet end is provided with a louvre assembly which may take the form of a series of double frusto-conical shaped rings 6 consisting of outwardly flared parts 7 and inwardly flared parts 8, the latter being substantially cylindrical. The rings 6 which are of uniformly varying diameter are eccentrically arranged one within the other and secured together by a bolt 9 which also serves for the attachment of a bracket 10 carrying a disc 11 concentrically arranged within the smallest ring 6 so as to conceal the aperture therethrough and the assembly is supported within the casing by means of brackets 12. The other or inlet end of the casing is partially closed by a domed member 13, shaped at its edges to form an inturned lip 14 and an outwardly flared portion 15, said member 13 being secured within the flared end by means of bolts 16 and spacing pieces 17 so as to leave an annular inlet passage 18. Adjacent this latter end the casing is provided with a plurality of apertures 19 which serve as the principal air inlets for a fan 20 secured upon the shaft of an electric motor 21 supported axially within the casing upon a bracket 22. An electric heater is mounted within the casing between the fan 20 and the outlet louvres 6, said heater comprising a resistance heating element 23 supported in spiral form upon a spider frame 24 carried by a bracket 25, said heating element being electrically insulated from said spider frame by bushes 26. The device may be provided with a main switch 27 and a heater switch 28 contained within a switch-box 29 secured to the inside of the casing, and power may be supplied to the device by means of a flexible electric cable 30 connected to a junction box 31 from whence wires make connection with the terminals of the switches 27 and 28, motor 21 and heater 23, one suitable arrangement being diagrammatically indicated in Figure 5, the connections being so arranged that while the fan 20 may be used without the heater 23, the heater cannot be used unless the fan is also in use. Since the device is of a portable nature a handle 32 may be provided for carrying purposes.

When the device is connected to the electric supply and the main switch 27 closed, the fan 20 is arranged to draw in air through the inlet apertures 18, 19 and impel it past the heater 23 and out through the louvres 6. The louvres 6 spread and evenly distribute the air stream as it passes therethrough and also conceal, and prevent access to, the interior of the device. As will be understood, the air is warmed or not as it passes the heater 23 according to whether the heater switch 28 is closed or open.

The device may be placed in any desired position and an evenly distributed flow of air, heated or not, may be obtained in any desired direction. If placed in a shop window the device can be made to direct a steady stream of warm air over a large area of the window, thereby effectively clearing it of condensation.

The device above described may be employed for evenly circulating heated air throughout a room, shop or office or for drying clothes quickly without risk of fire or scorching.

It will be understood that the particular form of the means for deflecting the air passing from the outlet may be varied according to the result it is desired to obtain; for instance they may be concentrically arranged so that the air is discharged more or less axially.

The motor employed in the device may, if desired, be furnished with any known means for varying the speed thereof and therefore of the fan, and consequently the volume of air passing through the device, an example of such means being illustrated in the modified circuit arrangement shown in Figure 6 which enables two different motor speeds to be obtained and differs from that of Figure 5 only by the addition in the motor circuit of a series resistance 33 which may form part of the heater element 23 and a switch 34. When said switch is open the motor runs at reduced speed due to the series resistance 33, normal full speed being obtained by closing the switch 34 and short circuiting said resistance.

As will be readily understood the switches need not necessarily be mounted in or upon the device but may form a separate unit electrically connected to the device by a multi-core cable of which the said cable 30 may form part.

What we claim is:

1. A heating and ventilating device comprising in combination a tubular casing provided with an air inlet at one end and an air outlet at the opposite end, means comprising a series of outwardly flared rings of uniformly varying diameter arranged eccentrically within one another in the same plane in said outlet, an electric fan and an electric heater both disposed within said casing, and means for connecting said fan and heater to a supply of electrical power.

2. A heating and ventilating device comprising in combination a tubular casing, an outwardly domed and flared end member disposed within said casing, an annular air inlet aperture formed between said member and casing, air inlet apertures provided in and around the circumference of said casing, an outlet comprising a series of outwardly flared rings of uniformly varying diameter arranged eccentrically within one another in the same plane at the opposite end of said casing, an electric motor, a fan mounted on the shaft of said motor coaxially supported within the casing adjacent the inlet end, an electric heater comprising a resistance element wound spirally upon insulators supported upon a spider frame coaxially supported within the casing between the fan and the outlet, means for connecting the motor and heater to a supply of electrical power, means for preventing the supply of power to the heater unless said fan is in operation, and means for including part of said heater resistance in the motor circuit so as to reduce the speed of said motor.

W. A. DUNCAN SMITH.
NORMAN H. WEBB.